(12) United States Patent
Axmann

(10) Patent No.: US 7,249,673 B2
(45) Date of Patent: Jul. 31, 2007

(54) BELT AND CONVEYOR HAVING SEPARATE CLAMPING SHOES

(75) Inventor: Norbert Axmann, Sinsheim (DE)

(73) Assignee: Interroll (Schweiz) AG, Sant' Antonino (CH)

( * ) Notice: Subject to any disclaimer, the term of this patent is extended or adjusted under 35 U.S.C. 154(b) by 24 days.

(21) Appl. No.: 11/077,353

(22) Filed: Mar. 10, 2005

(65) Prior Publication Data

US 2005/0199474 A1    Sep. 15, 2005

(30) Foreign Application Priority Data

Mar. 11, 2004  (DE)  ................ 10 2004 012 344

(51) Int. Cl.
  *B65G 15/02*  (2006.01)
(52) U.S. Cl. .................. 198/831; 198/842; 198/843
(58) Field of Classification Search ........... 198/831, 198/840, 841, 842, 843
  See application file for complete search history.

(56) References Cited

U.S. PATENT DOCUMENTS

| | | | | |
|---|---|---|---|---|
| 3,901,379 | A * | 8/1975 | Bruhm | 198/831 |
| 4,955,466 | A * | 9/1990 | Almes et al. | 198/831 |
| 5,332,082 | A | 7/1994 | Sommerfield | |
| 5,332,083 | A | 7/1994 | Axmann | |
| 5,394,977 | A * | 3/1995 | Cline | 198/831 |
| 5,857,559 | A | 1/1999 | Gianvito et al. | |
| 6,564,931 | B1 | 5/2003 | Edelmann | |
| 6,834,760 | B2 * | 12/2004 | Yamazaki | 198/831 |
| 6,962,252 | B2 * | 11/2005 | Fujiwara et al. | 198/837 |
| 6,974,022 | B2 * | 12/2005 | Saeki | 198/831 |
| 7,004,310 | B2 * | 2/2006 | Axmann | 198/831 |
| 7,073,660 | B1 * | 7/2006 | Hishinuma | 198/831 |

FOREIGN PATENT DOCUMENTS

| | | |
|---|---|---|
| DE | 2 055 682 | 5/1972 |
| DE | 37 07 558 | 9/1988 |
| DE | 38 26 953 | 3/1990 |
| DE | 42 13 035 | 10/1993 |
| DE | 198 05 204 | 8/1999 |
| DE | 198 54 327 | 6/2000 |
| DE | 199 53 691 | 5/2001 |
| EP | 0 880 462 | 7/1999 |
| FR | 2560168 | 8/1985 |
| NL | 8702617 | 6/1989 |

* cited by examiner

*Primary Examiner*—Joe Dillon, Jr.
(74) *Attorney, Agent, or Firm*—Collard & Roe, P.C.

(57) ABSTRACT

A belt band conveyor having an endless transport belt that is guided over deflection rollers, to which a guide element that projects beyond the belt plane is attached. The guide element can be handled separately before it is attached to the transport belt and moves along as the transport belt moves. On its guide surfaces, which extend in the transport direction of the transport belt, running surfaces that are inclined relative to the belt plane roll off from rotating guide rollers as the transport belt moves. A plurality of separate clamping shoes are attached along the transport belt, each of which has an attachment profile attached to the transport belt, and a spring-elastic clamping element connected with such profile. An elastic/flexible guide strip that extends in the transport direction over the entire length of the transport belt is clamped in place relative to the attachment profile.

18 Claims, 7 Drawing Sheets

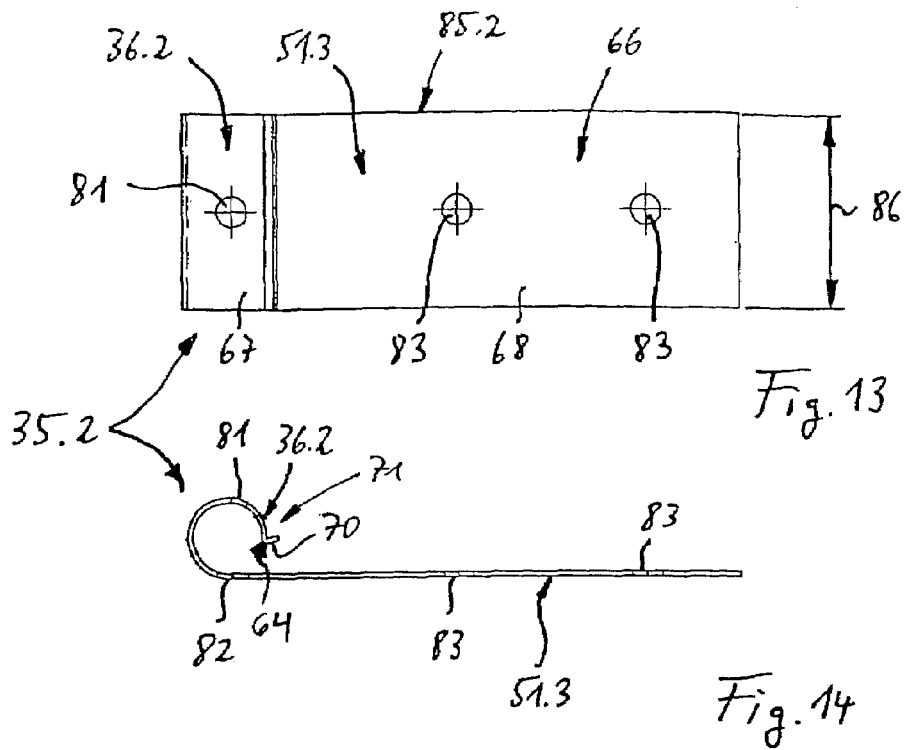
Fig. 13
Fig. 14
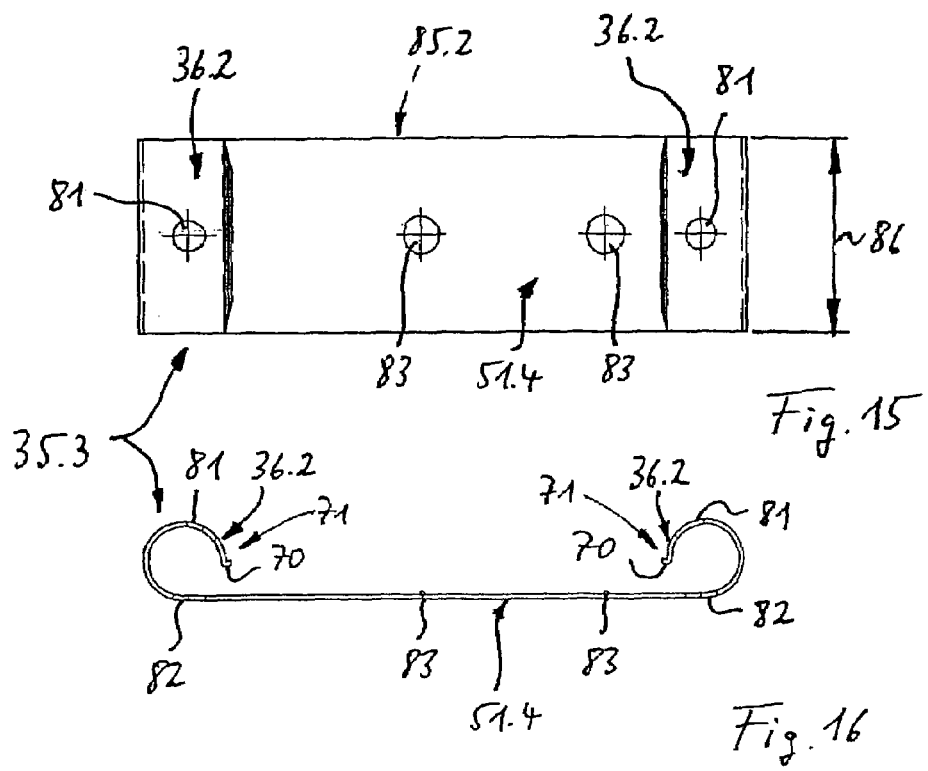
Fig. 15
Fig. 16

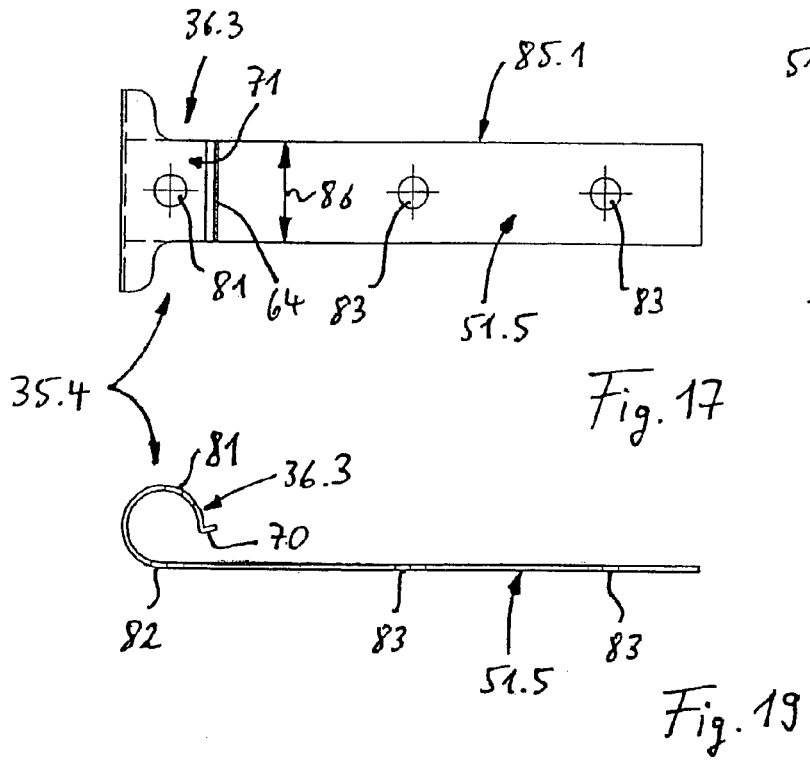
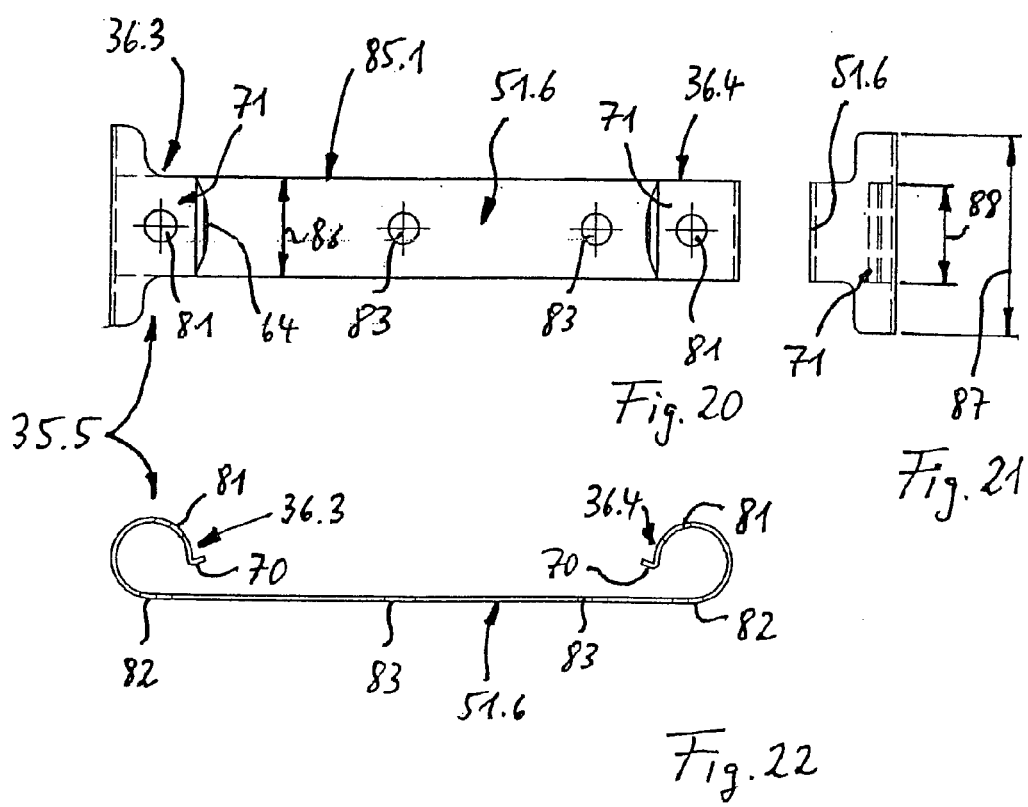

BELT AND CONVEYOR HAVING SEPARATE CLAMPING SHOES

BACKGROUND OF THE INVENTION

1. Field of the Invention

The invention relates to a belt band conveyor, particularly a curved belt conveyor, having an endless transport belt that is guided over deflection rollers. There is a guide element that projects beyond the belt plane and which can be handled separately before it is attached to the transport belt, and which moves along as the transport belt moves. The guide element has guide surfaces that extend in the transport direction of the transport belt. Running surfaces that are inclined relative to the belt plane roll off from rotating guide rollers on the guide surfaces, so that transverse forces that occur crosswise to the transport direction of the transport belt are compensated.

2. The Prior Art

A curved belt conveyor is described in German Patent No. DE 42 13 035 A1. This document describes a circulating endless transport belt which is connected with an edge bead that runs along its outside edge, is continuous, is inseparably connected with it, and circulates along with it. Several guide rollers are elastically pressed against this flank, which points towards the center of the curve, in order to compensate the longitudinal and traverse forces that occur as a result of the curve progression, even in the case of a severely distorted curve, and in the case of significant level differences between the deflection rollers at the end, with low friction wear.

A similar curved belt conveyor having a transport belt that is deflected via cone-shaped support rollers, which has a continuous, co-circulating, bead-shaped edge strip, is described in German Patent No. DE 38 26 953 A1. The edge strip, again, is guided between guide rollers that have inclined running surfaces, in order to compensate the centripetal forces that occur during operation.

A similar belt band conveyor is described in DE 198 54 327 A1. There, a toothed belt component of a continuous toothed belt that circulates with the transport belt is provided to transfer the force of the drive forces from a gear crown to the transport belt. The toothed belt component is connected with the transport belt by bonding, vulcanizing, or gluing. The toothed belt component has a bead strip on its ends that point radially inward, in each instance, which is continuous over the length of the transport belt. Again, inclined running surfaces of guide rollers engage on the bead, in order to be able to absorb the forces directed to the inside radius of belt curves, and in order to achieve secure guidance of the transport belt in this manner.

A further development of the belt band conveyor described above is disclosed in German Patent No. DE 199 53 691 A1, which relates to a belt tensioning device. There, a continuous toothed belt is attached to the bottom of the transport belt, moving with it, and an endless profile that lies opposite is attached to the top of the belt. The profile has an elevation that faces away from the edge region of the transport belt, which again contacts guide rollers. In order to secure the position of the transport belt when the belt starts up under stress, and in order to prevent the teeth of the gear wheel of the drive roller and the teeth of the toothed belt from becoming disengaged, several ball bearings are additionally provided, which contact the profile at the top of the transport belt.

Another system of a curved belt conveyor is described in German Patent No. DE 198 05 204 A1. There, a continuous holder strip is attached on the inside of a circulating transport belt, via the outside radius of the holder strip. Slide sleeves that can rotate about axles of rotation arranged perpendicular to the transport belt plane are attached to the holder strip; they are guided in guide grooves of guide rails, with a positive lock.

All of the aforementioned belt band conveyors have the disadvantage that the lifetime of the guide strips is very short. At high speeds, such guide strips fail after a relatively short period of use. In the case of wear-related damage or complete failure of the guide strips, the entire transport belt must be replaced. This is time-consuming and expensive.

Other embodiments relate to curved belt conveyors in which guide rollers that circulate with the belt are attached, and are guided in locally fixed guides. Such a curved belt conveyor is described in European Patent No. EP 0 880 462 B1. Several co-circulating rollers are provided on the endless transport belt of this conveyor, to guide it and to compensate radial forces that are directed toward the inside of the curve; the axles of rotation of these rollers are attached to the transport belt by way of attachment means that project through openings in the transport belt. As the transport belt circulates, the running surfaces of the co-circulating rollers run along either only vertical or vertical and horizontal stationary guide surfaces of a support frame.

Similar curved belt conveyors are described in U.S. Pat. No. 5,332,082 and NL-A-8702617. In the case of all these curved belt band conveyors, however, permanent excess stress in the region of the roller attachment to the belt can occur, in connection with the risk of canting and/or tearing in this region, so that these belt band conveyors cannot guarantee long life. However, a long life of the belt is particularly important, particularly in the case of belt curves, because as a rule, the belt is the most expensive element, and the replacement part is accordingly expensive. Another disadvantage in the case of these belt band conveyors is the great noise development, particularly at high circulation speeds.

SUMMARY OF THE INVENTION

It is therefore an object of the invention to provide a belt band conveyor with which operation that is uninterrupted over a long period of time is possible even at high circulating speeds, with low noise development.

It is another object of the invention to provide a belt band conveyor that is inexpensive to repair, particularly the guide elements that circulate with the transport belt.

According to the invention, this object is accomplished by a belt band conveyor having clamping devices, preferably clamping shoes, attached along the transport belt, in the transport direction. Each of the clamping shoes has an attachment profile attached to the transport belt, and a spring-elastic clamping element connected with such profile, by means of which an elastic/flexible guide strip that is preferably endless and extends essentially without interruption in the transport direction, forming the guide element, is clamped in place relative to the attachment profile.

In this way, the conveyor is simple and inexpensive to assemble, and inexpensive to repair, particularly the guide strip. Only slight noise development occurs even at high circulating speeds, and uninterrupted operation over a long period of time is possible with the clamping devices according to the invention.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 13 shows an enlarged top view of a clamping shoe in an embodiment according to FIGS. 4, 5, and 7;

FIG. 14 shows a longitudinal side view of the clamping shoe according to FIG. 13;

FIG. 15 shows an enlarged top view of a clamping shoe in an embodiment according to FIG. 8;

FIG. 16 shows a longitudinal side view of the clamping shoe according to FIG. 15;

FIG. 17 shows an enlarged top view of a clamping shoe in another embodiment;

FIG. 18 shows a crosswise side view of the clamping shoe according to FIG. 17;

FIG. 19 shows a longitudinal side view of the clamping shoe according to FIG. 17;

FIG. 20 shows an enlarged top view of a clamping shoe in another embodiment;

FIG. 21 shows a crosswise side view of the clamping shoe according to FIG. 20; and FIG. 22 shows a longitudinal side view of the clamping shoe according to FIG. 20.

DETAILED DESCRIPTION OF THE PREFERRED EMBODIMENT

Figure 1:
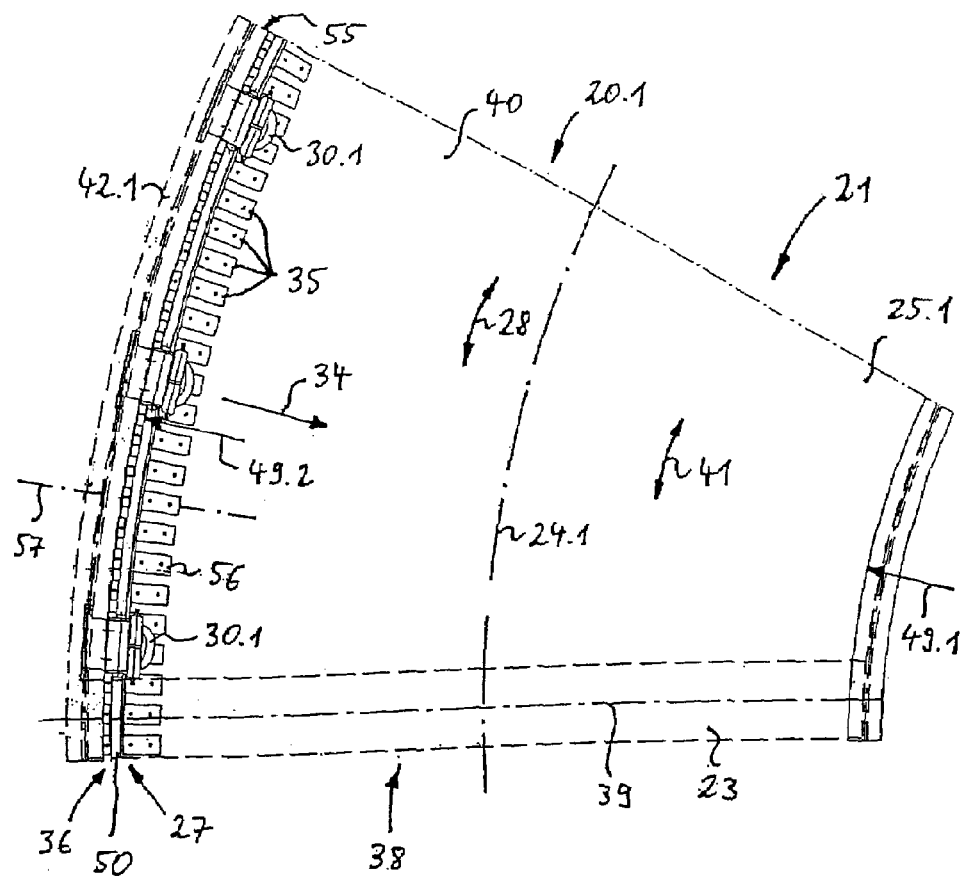
FIG. 1 shows a belt band conveyor according to the invention, which is configured as a curved belt conveyor, in a top view from above.

Referring now in detail to the drawings, FIG. 1 shows a belt band conveyor 20.1 configured as a curved belt conveyor 21. This has a transport segment 44 of a belt curve 38 that extends over a circular ring sector 40, which is formed by a closed, endless, band-shaped transport belt 25.1. Transport belt 25.1 can be guided by way of deflection rollers 23 that are arranged at both ends of the circular ring sector 40, as well as by way of running rollers that are arranged at uniform angular distances between them, which are not shown in FIG. 1. The axes of the running rollers intersect in the center of the circular ring sector 40, in a center point.

The running rollers can be rollers that rise conically from inside radius 49.1 of belt curve 38 to outside radius 49.2 of belt curve 38, or cylindrical rollers. Deflection rollers 23 and/or the running rollers can be formed, in each instance, from roller segments that are mounted on side cheeks 42.1, 42.2 of curved belt conveyor 21, axially adjacent to and independent of one another, preferably mounted to rotate freely.

Figure 2:
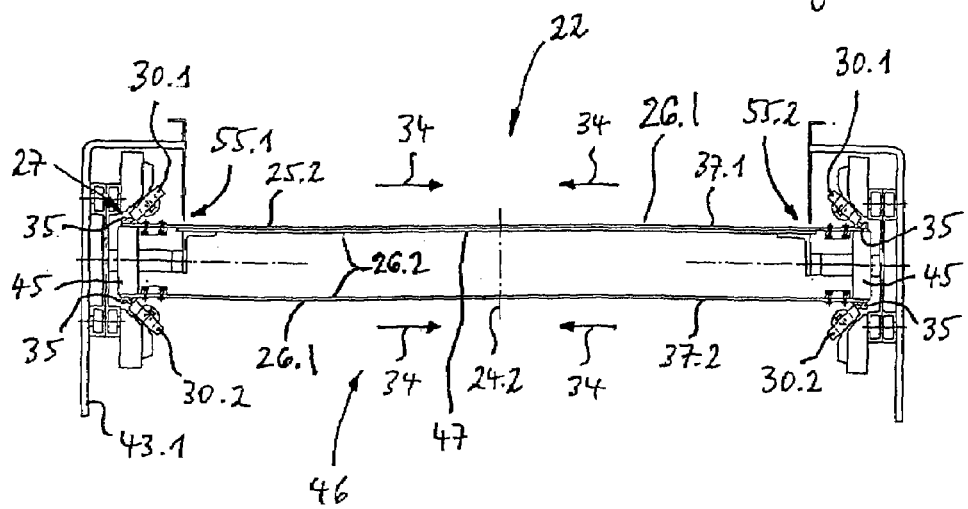
FIG. 2 shows an alternative exemplary embodiment of a belt band conveyor according to the invention, which is configured as a straight belt conveyor, in a cross-section that runs perpendicular to the belt plane and perpendicular to the transport direction.

FIG. 2 illustrates a cross-section of a belt band conveyor 20.2 that is configured as a straight belt conveyor 22. Belt conveyor 22 also comprises a closed, endless, band-shaped transport belt 25.2. Transport belt 25.2 is also guided by way of deflection rollers (not shown) that are arranged at the two ends, in each instance, as well as by way of running rollers 45 that are arranged spaced apart between them. Running rollers 45 can be cylindrical or preferably spherical rollers. The deflection rollers and running rollers 45 are mounted on side cheeks 43.1, 43.2, and can rotate about roller axles that are configured parallel to belt plane 26.1, 26.2.

Both in the case of the curved belt conveyor 21 according to FIG. 1 and in the case of the straight belt conveyor 22 according to FIG. 2, support plates 47 can be arranged between upper belt segment 37.1 and lower belt segment 37.2, as well as between deflection rollers 23, i.e. between deflection rollers 23 and running rollers 45, parallel to lower belt plane 26.2, which prevent upper belt segment 37.1 from sagging under severe stress.

The invention can be used not only for belt curves 38 and straight belts 46, but also for belt S-designs that bridge different levels.

The drive of transport belts 25.1, 25.2 which, for the sake of simplicity, are designated with the reference symbol 25 hereinafter, can take place by means of a drive unit arranged below lower belt segment 37.2, e.g. by means of a motordriven friction wheel, which can interact with lower belt segment 37.2 of transport belts 25. The drive of transport belts 25 can, however, also take place directly, by way of running rollers 45, and/or by way of deflection rollers 23.1, 23.2, by friction or by means of a non-positive lock. Finally, the drive of transport belts 25 can also take place with a positive lock. For this purpose, engagement elements 74 on the drive side can be provided, which interact with engagement elements 73 on the power take-off side, which in turn are attached to transport belt 25 (see FIGS. 5 to 8 and 10 to 12).

In the case of curved belt conveyor 21, a plurality of separate clamping shoes 35; 35.1 to 35.5 are attached in the region of side edge 55 of belt curve 38 and, in the case of straight belt conveyor 22, in the region of side edges 55.1, 55.2 of transport belt 25.2, in each instance, here projecting beyond belt planes 26.1, 26.2 in the direction of the sides facing away from deflection rollers 23, which shoes run along with transport belts 25; 25.1, 25.2 as they circulate.

Figure 3:
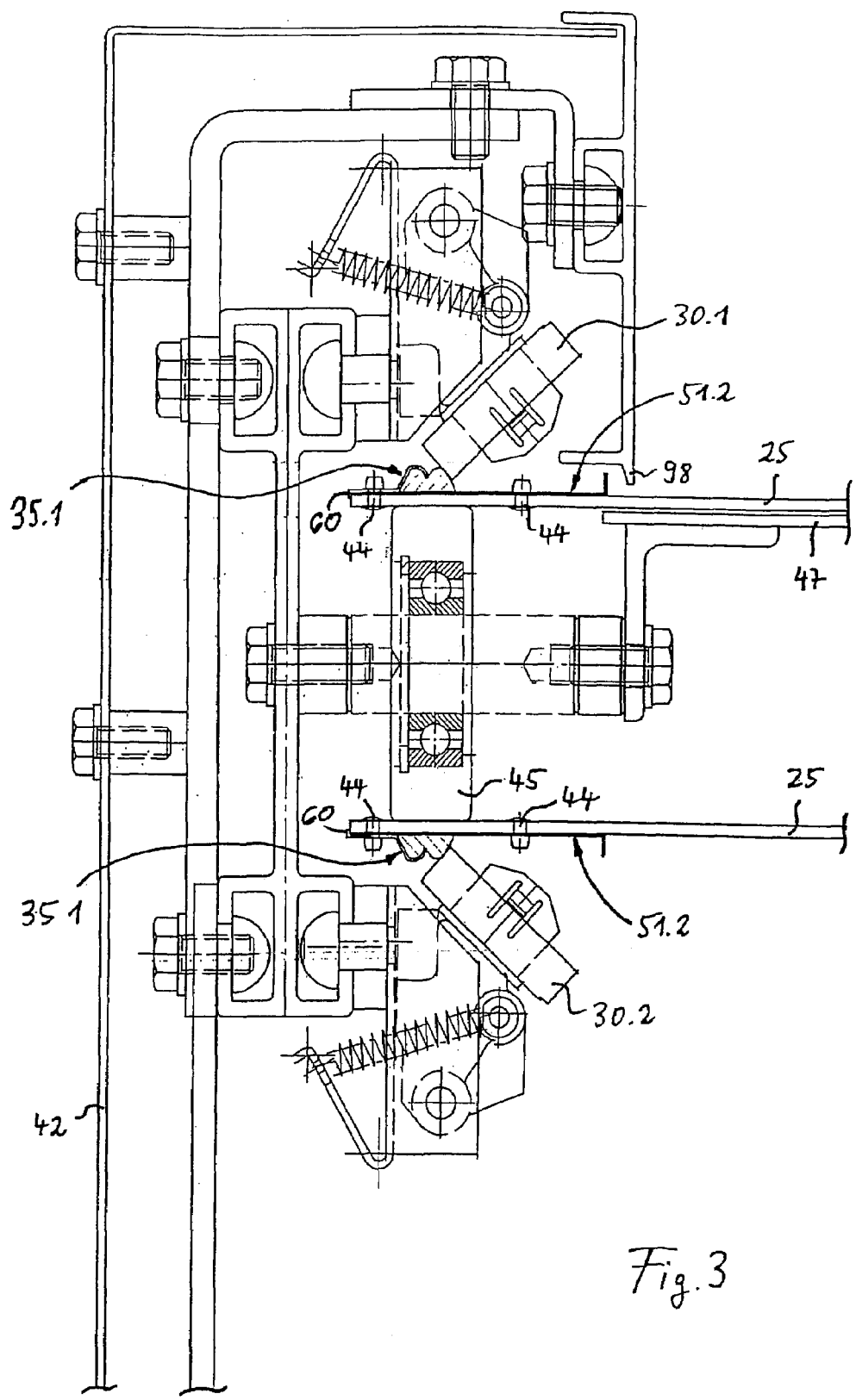
FIG. 3 shows an enlarged detail in the region of an outside edge of a transport belt, in a cross-section perpendicular to the transport direction, with a clamping shoe attached to the transport belt in the region of the outside edge of the belt, on the side facing away from a running roller, in a first embodiment.
Figure 9:
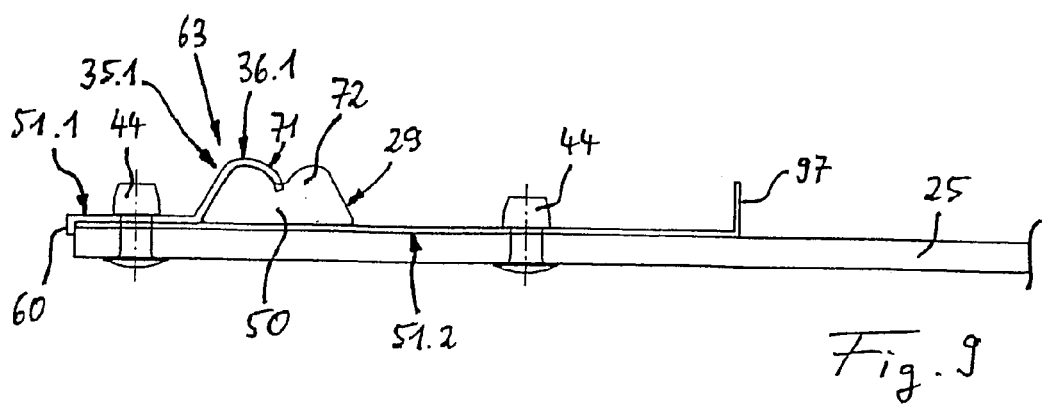
FIG. 9 shows in an enlarged cross-section perpendicular to the transport direction, a clamping shoe attached to the transport belt, according to the embodiment shown in FIG. 3.

Each clamping shoe 35; 35.1 to 35.5 comprises an attachment profile 51; 51.1 to 51.6 for attaching clamping shoe 35; 35.1 to 35.5 to transport belt 25, and preferably a clamping element 36; 36.1 to 36.4 that projects beyond belt plane 26.1, in the direction facing away from deflection rollers 23. The clamping element 36; 36.1 to 36.4 preferably follows attachment profile 51; 51.1 to 51.6 towards the outer edge of transport belt 25. As shown in FIGS. 3 and 9, however, clamping element 36.1 can also follow attachment profile 51.1 towards the belt center. Accordingly, different arrangements and attachment variants can be used.

Using the clamping element 36; 36.1 to 36.4, in each instance, a guide strip 50, which extends essentially without interruption over the entire length of transport belt 25 in transport direction 28 and is preferably an endless, elastic/flexible or flexible strip, is clamped in place relative to attachment profile 51; 51.1 to 51.6, in each instance. Guide strip 50 is a guide element 27 that projects beyond belt plane 26.1, 26.2, which can be handled separately before being attached to transport belt 25, and which runs along with transport belt 25 as the latter circulates. On guide surfaces 29, which extend in transport direction 28 of transport belt 25, running surfaces 31 of guide rollers 30; 30.1, 30.2 that are inclined relative to the belt plane 26.1, 26.2 roll off as the transport belt 25 circulates, so that transverse forces that occur crosswise to the transport direction of transport belt 25 can be compensated. In other words, therefore, support or guide rollers 30; 30.1, 30.2 that can rotate about axles of rotation 47 engage on guide surfaces 29 of guide strip 50, which are inclined towards belt center 24.1, 24.2, on the side of the guide strip 50 facing towards the belt center 24.1, 24.2, as transport belt 25 circulates, with their running surfaces that are inclined relative to belt plane 26.1, 26.2, and roll off there. Guide rollers 30; 30.1, 30.2 can be assigned to upper belt segment 37.1 and/or lower belt segment 37.2.

Guide strip 50 shown in the figures is structured as a bead strip, preferably configured with an edge bead 78, to be clamped in place on clamping element 36; 36.1 to 36.4, and with a guide bead 72 that has guide surface 29 for the support and guide rollers 30; 30.1, 30.2, which beads extend parallel to one another in transport direction 28. It is understood, however, that the guide strip can also be configured in any other desired manner, within broad limits, in other words with only a single bead or as a flat strip.

As the transport belts 25 circulate, longitudinal and transverse forces 34 can occur. In the case of curved belt conveyors 21, forces 34 that are directed radially inwards occur in operation, in particular. These forces can be absorbed or compensated by means of guide rollers 30 that engage on guide strip 50, which rollers in turn are attached, clamped in place on the transport belt 25, using clamping shoes 35; 35.1 to 35.5. Consequently, the invention relates to a belt band conveyor 20.1, 20.2, particularly a curved belt conveyor 21, having an endless transport belt 25 that is guided by way of deflection rollers 23. A guide element 27 that projects beyond the belt plane 26.1, 26.2 is attached to the conveyor, which element can be separately handled before being attached, and which runs along with transport belt 25 as it circulates, and on which running surfaces 31, inclined relative to belt plane 26.1, 26.2, of preferably rotating support or guide rollers 30 make contact on guide surfaces 29. Guide surfaces 29 are preferably essentially flat and extend in the transport direction 28 of the transport belt 25, as the transport belt 25 circulates, so that crosswise forces 34 that occur crosswise to transport direction 28 of transport belt 25 can be compensated. A plurality of separate clamping devices, preferably in the form of clamping shoes 35, are attached to transport belt 25, along the belt in transport direction 28. The clamping devices each have an attachment profile 51 attached to transport belt 25, and a spring-elastic clamping element 36 that is connected with the profile, by means of which a preferably endless, elastic/flexible guide strip 50, which forms guide element 27 and extends essentially without interruption over the entire length of transport belt 25, in transport direction 28, is clamped in place relative to attachment profile 51.

In this connection, as shown in the figures, guide strip 50 can be clamped in place, with elastic deformation of clamping element 36; 36.1 to 36.3 by the guide strip 50. Furthermore, guide strip 50 can preferably be clamped in place on the attachment profile with a positive lock and/or with a non-positive lock.

According to a particularly preferred embodiment, guide strip 50 can be clamped in place on an attachment profile 51 that is disposed between transport belt 25 and guide strip 50, with a positive and/or non-positive lock. In this way, it is possible to attach the guide strip to transport belt 25 separately, and lifted off from the latter, using clamping elements 36; 36.1 to 36.4.

Figure 6:
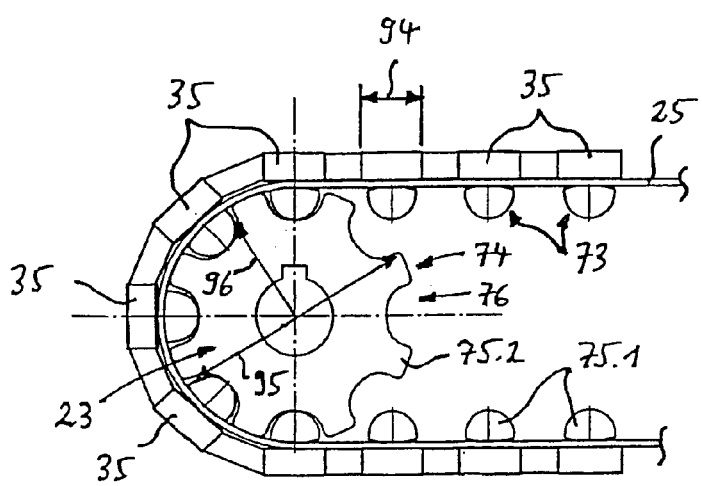
FIG. 6 shows a partial longitudinal cross-section in the transport direction, in the region of a deflection roller provided with drive teeth.
Figure 7:
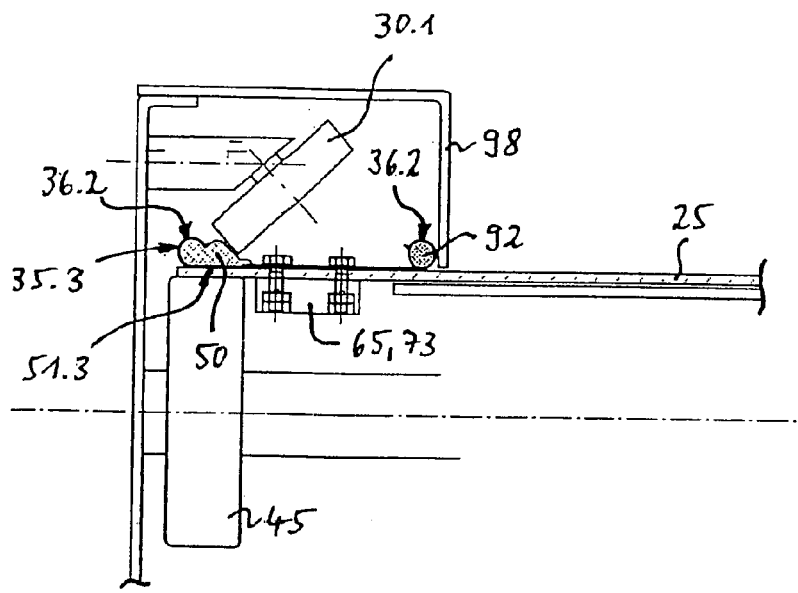
FIG. 7 shows an enlarged detail in the region of an outside edge of a transport belt, in a cross-section perpendicular to the transport direction, with a clamping shoe attached to the transport belt in the region of the outside edge of the belt, facing away from a running roller, according to a another embodiment.
Figure 8:
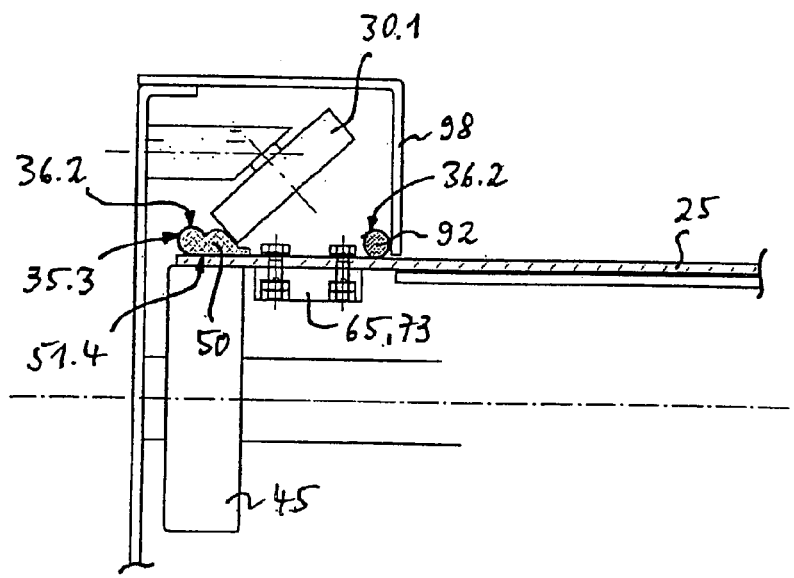
FIG. 8 shows an enlarged detail in the region of an outside edge of a transport belt, in a cross-section perpendicular to the transport direction, with a clamping shoe attached to the transport belt in the region of the outside edge of the belt, facing away from a running roller, according to a another embodiment.

Guide strip 50 can be clamped in place by clamping element 36; 36.1 to 36.4, inhibiting and/or preventing a displacement of guide strip 50 in transport direction 28, and secured relative to attachment profile 51, so that guide strip 50, clamped in place between two adjacent clamping elements 36; 36.1 to 36.4, is elastically stretched as transport belt 25 circulates about deflection rollers 23, in a region between adjacent clamping elements 36; 36.1 to 36.4, as can be clearly seen in FIG. 6.

Figure 12:
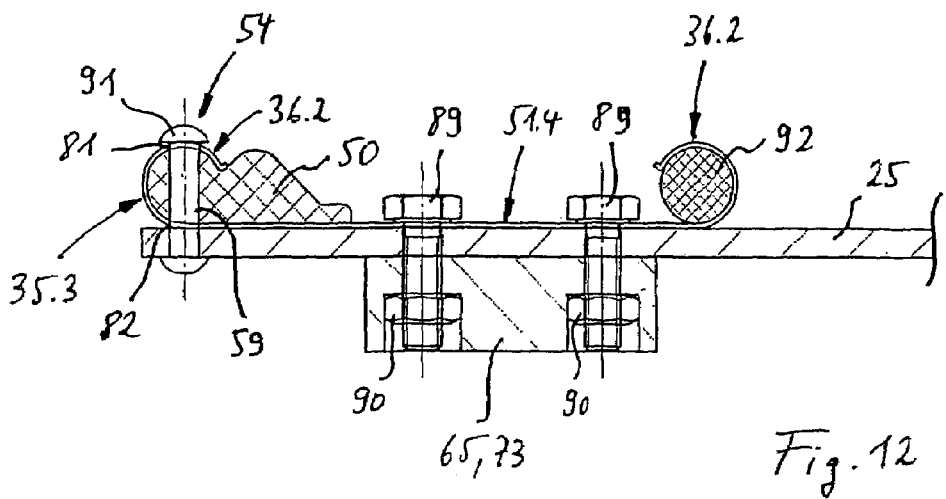
FIG. 12 shows in an enlarged cross-section perpendicular to the transport direction, the clamping shoe according to FIG. 11, to illustrate an additionally possible positive-lock anchoring of a guide strip to a transport belt using a rivet.

Guide strip 50 consists of an elastic/flexible material that can follow the relatively great expansions, for example more than 5 or 10 percent, that occur as guide strip 50 circulates with transport belt 25, with purely elastic deformation, in other words without the occurrence of a permanent deformation of guide strip 50. The guide strip preferably consists of an elastically stretchable material, preferably polyurethane. Such guide strips can be produced inexpensively, using the extrusion method. Guide strip 50 can be cut to length as a function of the length of transport belt 25, in each instance. Within the course of the lowest possible noise development, the two cut points or abutment points of the guide strip can be glued together or joined by means of other connection methods or connection means that appear to be suitable. Independent of this, guide strip 50, in the assembled state, is preferably penetrated at least partially by an anchoring element 54 rigidly connected with clamping element 36; 36.1 to 36.4 and/or rigidly connected with attachment profile 51; 51.1 to 51.4, in the assembled state, at least in the aforementioned abutment regions, which element results in positive-lock fixation of guide strip 50 relative to attachment profile 51; 51.1 to 51.4. Such an embodiment is shown in FIG. 12. There, a rivet 91 is provided as the anchoring element 54, which rivet is inserted through a passage opening 81 in clamping element 36.2 and a passage opening 82 in attachment profile 51.4 that lies opposite to it, as well as through a passage opening 59 of edge bead 78 of guide strip 50 that lies between them.

Attachment profile 51; 51.1 to 51.4 is preferably configured as a thin attachment strip 66. Attachment strip 51, and preferably the entire clamping shoe 36; 36.1 to 36.4 preferably consists of a material that is much harder and stiffer than guide strip 50. Preferably, clamping element 36; 36.1 to 36.4 and/or attachment profile 51; 51.1 to 51.4 each consist of spring steel. Most preferably, clamping element 36; 36.1 to 36.4 and/or attachment profile 51; 51.1 to 51.4 are each structured as a thin sheet-metal part 67, 68. In the embodiments shown in the figures, clamping shoes 35; 35.1 to 35.5 each consist of spring steel, and each clamping element 36; 36.1 to 36.4 is connected in one piece with one of the attachment profiles 51; 51.1, 51.3 to 51.6, which is configured as a thin attachment strip 66.

With the exception of the embodiment shown in FIG. 12, guide strip 50 is clamped in place so it can be released again, without being destroyed, using a clamping element 36. If guide strip 50 is attached to transport belt 25 using rivet 91 shown in FIG. 12, with a positive lock, releasing the connection is only possible if rivet 91 is destroyed. Alternatively, of course, a nut/screw combination could be used, for example, instead of a rivet 91. Furthermore, it is understood that corresponding anchoring elements for a positive-lock attachment, i.e. fixation of guide strip 50 to transport belt 25 can be implemented not only in their abutment regions, but also at several or even all of clamping shoes 35. This would have the advantage that in case of a local failure of guide strip 50, this damage would then be limited to a locally narrowly limited region between two adjacent clamping shoes 35, without guide strip 50 coming loose over a large area, which would be connected with a failure of the entire belt band conveyor.

As is particularly evident from FIGS. 13 to 22 in combination with FIGS. 9 to 12, clamping element 36; 36.1 to 36.4 can advantageously be configured as a catch or snap element 63, on or into which guide strip 50 is engaged and/or snapped. In this connection, catch or snap element 63 can preferably be configured to be coordinated with guide strip 50, in such a manner that manual, preferably tool-free engagement or snap-in of guide strip 50 is made possible. Therefore, guide strip 50 with its edge bead 78 can be pushed in the direction of the opening mouth of clamping element 36; 36.1 to 36.4, in each instance, with simultaneous elastic expansion of the spring-elastic clamping element, until edge bead 78 engages or snaps in there. In this connection, catch or snap element 63 can be configured coordinated with guide strip 50, so that guide strip 50 can be manually released from clamping shoe 35; 35.1 to 35.5, in each instance.

In order to facilitate joining of guide strip 50 with clamping shoe 35; 35.1 to 35.5, clamping element 36; 36.1 to 36.4 has an insertion slant 70, preferably beveled, at its free end 64, which facilitates insertion of guide strip 50. Clamping element 36; 36.1 to 36.5 is preferably configured with a clamping part 71 that at least partially engages around and/or behind the edge of guide strip 50. Clamping part 71 can engage around and behind edge bead 78 of guide strip 50, as shown in the figures, or only engages around it or only engages behind it.

It can be particularly advantageous if clamping shoes 35.4, 35.5 have a T-shaped outside contour 85.1 in a projection plane parallel to belt plane 26.1, 26.2 (FIGS. 17 to 22). Alternatively, the clamping shoes can also have a double-T-shaped outside contour. Furthermore, the attachment profile 51.5, 51.6 preferably has an average width that is less than the average width of clamping element 36.3 (see, in particular, FIGS. 17 and 20).

Clamping element 36.3 has a width 87, at least in partial regions, which is preferably much greater than the average width 86 of attachment profile 51.5, 51.6. In addition, clamping element 36.3 has a width 88, at its free end 64, which is preferably much less than width 87 of the clamping element 36.3 in a transition region between clamping element 36.3 and attachment profile 51.5, 51.6, as is clearly evident in the embodiment according to FIGS. 17 to 22.

Alternatively, clamping shoes 35.1 to 35.3 can have an essentially rectangular outside contour in a projection plane parallel to belt plane 26.1, 26.2 (FIGS. 13 to 16). It can furthermore be provided that clamping shoes 35 have an average width 94, in transport direction 28, that is less than the effective deflection diameter 65 of deflection roller 23. Preferably, it can be provided that the average width 94 of clamping shoes 35 is equal to or smaller than the effective deflection radius 96 of deflection roller 23, as shown in the embodiment according to FIG. 6.

Figure 4:
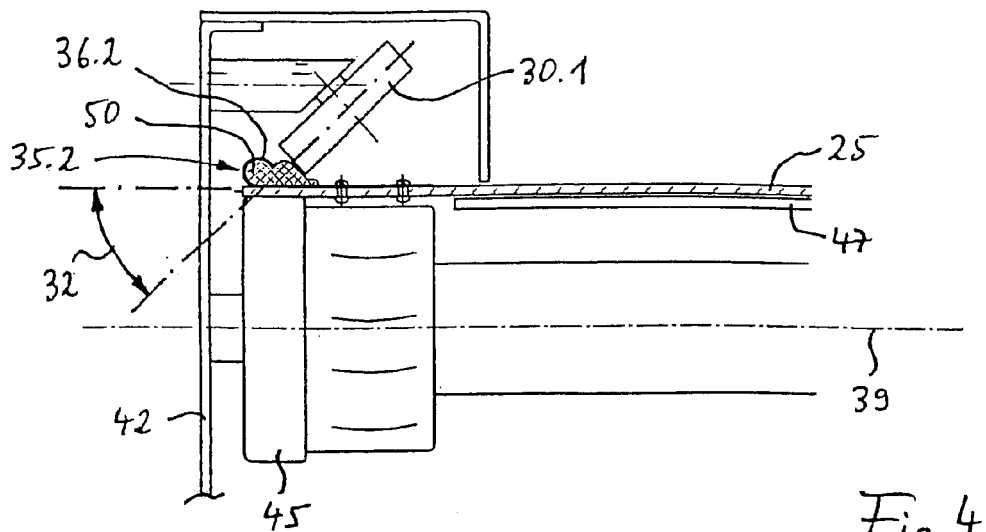
FIG. 4 shows an enlarged detail in the region of an outside edge of a transport belt, in a cross-section perpendicular to the transport direction, with a clamping shoe attached to the transport belt in the region of the outside edge of the belt, by means of rivets, according to a second embodiment.
Figure 5:
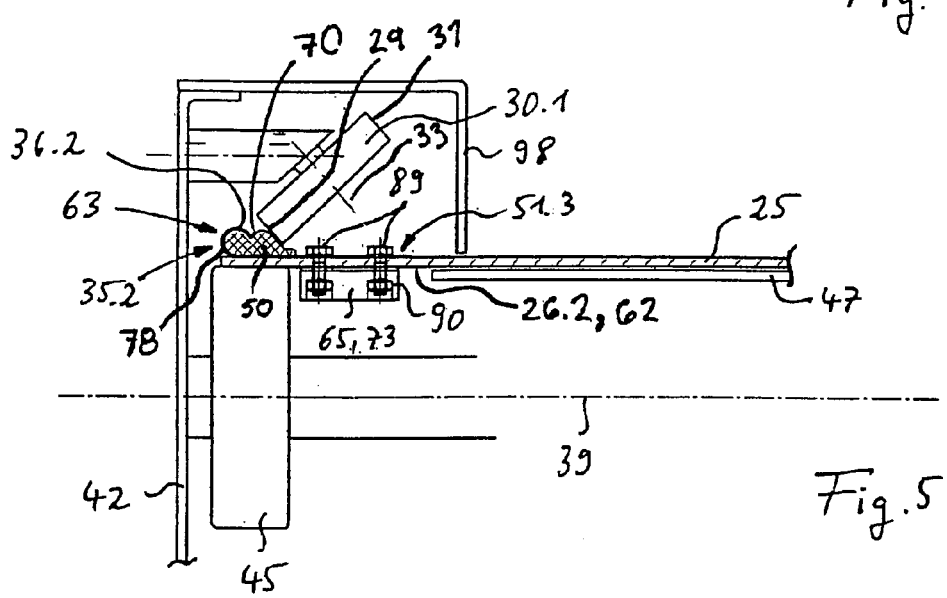
FIG. 5 shows in a view according to FIG. 4, a preferred attachment for a clamping shoe, using an attachment body configured as a tooth, which can be brought into engagement with drive teeth of a conveyor belt drive, in order to bring about a positive-lock drive of the transport belt.

The attachment of clamping shoes 35; 35.1 to 35.5 by way of their attachment profile 51.1 to 51.6, in each instance, preferably takes place in that at least one point-shaped attachment point 56 is formed between the attachment profile and transport belt 25, whereby preferably, a line-shaped attachment point 57 that runs crosswise to the transport direction is formed (FIG. 1). In this way, even small deflection radii of deflection rollers can be implemented, at high speeds of circulation, with problem-free operation of the belt band conveyor over an extended period of time. It is practical if attachment profile 51 is attached to transport belt 25 by means of rivets 44 or screws 89. Attachment using rivets 44 is evident from the embodiments shown in FIGS. 3, 4, and 9. Attachment using screws is shown in FIGS. 2, 5, 7, 8, and 10 to 12.

Clamping shoes 35 are preferably attached in the region of side edge 55 of the front belt. Attachment profile 51.1 preferably has a projection 60 that engages behind side edge 55 of the front belt 25 (FIGS. 3 and 9). In this way, a particularly precise and predefined attachment position of the clamping shoe 35.1, on the one hand, and of the guide strip 50, on the other hand, can be assured.

The attachment profile 51 is preferably disposed on a first side 61 of transport belt 25, and attached by way of an attachment body 65 disposed on second side 62 of the transport belt, which faces away from first side 61 of transport belt 25. Such an embodiment is particularly advantageous in connection with a positive-lock drive of the belt band conveyor (see FIG. 6, for example).

The attachment of such an attachment body can be achieved in various ways. For example, the attachment profile and/or the attachment body can be attached to the transport belt using at least one catch element on the transport belt that can be inserted into or through a passage opening in the transport belt formed crosswise to belt plane 26.1, 26.2. The catch element comprises a male insertion element that can be engaged in a related female accommodation element, so that in the assembled state, the catch insertion element is engaged on or in the accommodation element, forming a fixed connection to the transport belt that lies between them. The attachment profile surrounds the insertion element, and the attachment body surrounds the accommodation element. Alternatively, the attachment body can surround the insertion element, and the attachment profile can surround the accommodation element. Finally, the attachment body may have a projection that engages behind outside edge 55 of transport belt 25. Finally, it can be advantageous if the attachment profile is connected with the attachment body, in each instance, by way of an edge part that surrounds side edge 55 of transport belt 25. It is practical if the edge part is connected in one piece with the attachment profile and the attachment body. Finally, the edge part can be structured as a hinge about which the attachment profile and/or the attachment body is pivoted for the purpose of attachment to the transport belt 25. The hinge is preferably disposed in the region of side edge 55 of transport belt 25, after the attachment profile has been attached to the transport belt.

According to a particularly preferred embodiment of the invention, attachment body 65 is configured with an engagement element 73 on the power take-off side, which element is intended to be brought into interaction with an engagement element 74 on the drive side, in order to bring about a movement of the transport belt 25 in the transport direction. It is particularly advantageous if attachment body 65 is structured with a belt-side tooth 75.1 that can be brought into engagement with teeth 75.2 of a gear crown 76 on the drive side, in order to bring about a positive-lock drive of the transport belt. Such advantageous embodiments are evident from FIGS. 2, 5 to 8, as well as 10 to 12.

In a preferred embodiment, two clamping shoes 35, in each instance, are attached to the transport belt 25 that lies between them, lying opposite one another. Guide strip 50 preferably has guide surfaces for guide rollers 30, 30.1, 30.2, which have a convex curvature in a sectional plane that lies perpendicular to the belt plane and perpendicular to the transport direction.

According to an advantageous embodiment of the invention, attachment profiles 51.2, 51.4 have a sealing shank 97, in the region of their ends facing away from guide surfaces 29 of the guide strip 50 and in the direction of belt center 24, which shank projects beyond the belt plane 26.1, in each instance, and which vertically overlaps a cover shank 98 that extends crosswise to the belt plane 26.1 in the direction towards transport belt 25. Such an embodiment is evident from FIGS. 3 and 9, and FIGS. 7 and 8.

In this situation, attachment profile 51.3 to 51.6 is firmly connected with another clamping element 36.2, 36.3, by means of which an elastic/flexible, preferably endless sealing band 92, which extends in transport direction 28, preferably essentially without interruption, over the entire length of transport belt 25, is clamped in place relative to attachment profile 51.3 to 51.6, which vertically overlaps a cover shank 98 that is disposed fixed in place and extends crosswise to belt plane 26.1, in the direction towards transport belt 25.

By means of the aforementioned measures, an advantageous seal and/or delimitation from the transport route towards lateral guide and/or drive parts can be achieved. If, for example, comparatively small items of goods are being transported on transport belt 25, or piece goods that contain such small parts, for example screws and similar attachment means, or if, for example, the belt band conveyor is being used in the airport sector, where baggage items such as suitcases with address tags and similar thin parts are being transported, it is possible to provide a successful barrier or seal towards guide strip 50 and thereby towards guide rollers 30; 30.1, 30.2. Consequently, undesirable penetration of the aforementioned parts into this region cannot occur during the course of transport along the transport route, which otherwise could result in wedging, damage, up to complete failure of the belt band conveyor. Clamping element 36.2, 36.3 for guide strip 50 and clamping element 36.2, 36.3, 36.4 for sealing band 92 are structured in the same or similar manner.

Finally, it can be provided that clamping shoe 35.2, 35.4 for guide strip 50 and an additional clamping shoe 35.2, 35.4 for sealing band 92, containing the clamping element 36.2, 36.3 for sealing band 92 and an attachment profile 51.3 connected with it, are structured in the same or similar manner. Finally, attachment profile 51.3, 51.5 for clamping element 36.2, 36.3 for the guide strip and attachment profile 51.3, 51.5 for clamping element 36.2, 36.3, 36.4 for the sealing band 92 are preferably attached to transport belt 25 lying on top of one another. Furthermore, clamping element 36.2, 36.3 for guide strip 50 and clamping element 36.2, 36.3, 36.4 for sealing band 92 are preferably connected in one piece with attachment profile 51.4, 51.6.

Guide strip 50 and/or the sealing band 92 may consist of a hard, impact-resistant, but elastically stretchable plastic, preferably of polyurethane. Furthermore, guide strip 50 may be configured as a bead strip.

Advantageous designs and arrangements of different embodiment variants of clamping shoes 35; 35.1 to 35.5 will be described in the following, using FIGS. 9 to 22:

FIG. 9 shows a clamping shoe 35.1 that, like all the clamping shoes 35, comprises an attachment profile 51.1 and a clamping element 36.1 that is connected in one piece with the latter, for its attachment to transport belt 25. Just like all the other exemplary embodiments of clamping shoes 35 that are shown in the figures, clamping shoe 35.1 is structured as a thin sheet-metal part made of spring steel. Such spring-steel clamping shoes can have a thickness of less than 1 mm, for example, preferably less than or equal to 0.5 mm.

Clamping shoe 35.1 shown in FIG. 9 has a projection 60 at its end facing away from the free clamping end, here bent away or beveled at an angle of 90 degrees, which engages over the outside or side edge 55 of transport belt 25. Clamping shoe 35.1 is attached to transport belt 25 by means of a rivet 44. In the embodiment shown, another separate attachment profile 51.2 is provided. Here, this is attached to transport belt 25 by two rivets 44, and supports attachment profile 51.1 of the clamping shoe 35.1 and also the base of the guide strip 50, towards transport belt 25. Attachment profile 51.1 of clamping shoe 35.1 overlaps attachment profile 51.2. Attachment profile 51.2 has a sealing shank 97, which projects beyond belt plane 26.1 at its free end. In the embodiment shown, clamping shoe 35.1 is disposed in the region of side edge 55 of transport belt 25, in such a manner that clamping element 36.1 extends towards belt center 24.

Figure 10:
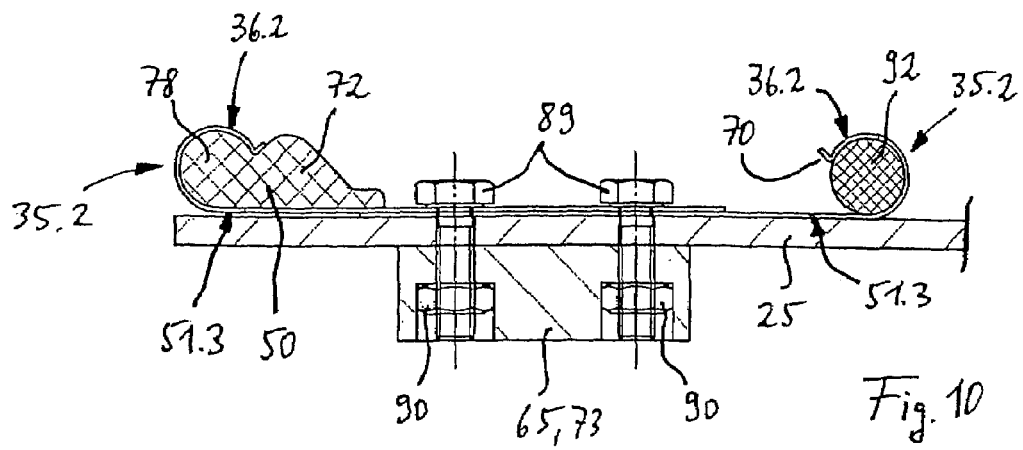
FIG. 10 shows in an enlarged cross-section perpendicular to the transport direction, a clamping shoe attached to the transport belt, according to the embodiment shown in FIG. 7.

FIG. 10 shows a exemplary embodiment of a clamping shoe 35.2. However, differing from the aforementioned embodiment, attachment profile 51.3 connected with clamping element 36.2 for guide strip 50 is attached to transport belt 25 towards belt center 24, relative to guide strip 50, where here this takes place using screws 89.

In this connection, attachment profile 51.3 that serves as a support for guide strip 50 relative to transport belt 25 is connected in one piece with clamping element 36.2. Therefore, there are not two separate and partially overlapping attachment profiles 51.1, 51.2 that are provided, as is the case in the embodiment shown in FIG. 9, but instead, only a single attachment profile 51.3 is provided.

In the embodiment shown in FIG. 10, another clamping shoe 35.2 is provided, which preferably clamps a sealing band 92 in place. Here, this clamping shoe 35.2 is configured in the identical manner as clamping shoe 35.2 for guide strip 50. The attachment of the two clamping shoes 35.2 takes place by way of two screws 89, in such a manner that attachment shank 51.3 of clamping shoe 35.2 for the sealing band 92 rests directly on the transport belt, while attachment shank 51.3 of clamping shoe 35.2 for guide strip 50 is directly attached to attachment shank 51.3 of clamping shoe 35.2 for sealing band 92, partially overlapping the shank. For the purpose of attachment using two screws 89 and corresponding nuts 90, attachment shanks 51.3, as shown in FIG. 13 as examples, have corresponding passage openings 83.

Using screws 89 and nuts 90, an attachment body 65 is furthermore attached to transport belt 25, whose cross-section is shown in FIG. 6 and which has a semi-cylindrical outside contour here. Attachment body 65 serves as an engagement element 73 on the power take-off side, in the form of a tooth 75, which can be brought into engagement with an engagement element 74 of a gear crown 76 on the drive side, as is also shown in FIG. 6. It is understood that tooth 75 can also be structured in a different manner, for example with involute flanks and similar tooth shape configurations.

Figure 11:
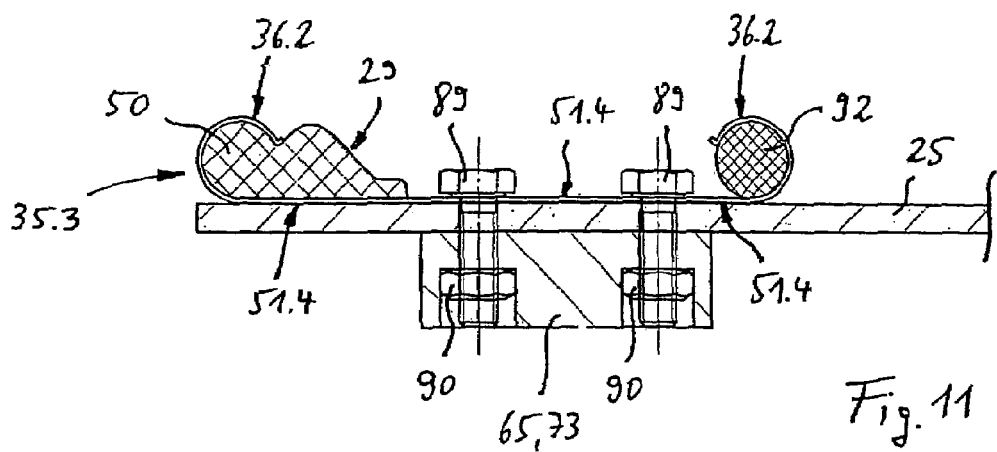
FIG. 11 shows in an enlarged cross-section perpendicular to the transport direction, a clamping shoe attached to the transport belt, according to the embodiment shown in FIG. 8.

Another embodiment of a clamping shoe 35.3 and its attachment to a transport belt 25 is shown in FIG. 11. In this connection, only a single attachment profile 51.4 is provided, which is connected in one piece with clamping elements 36.2 that have the identical structure and are disposed on both ends of the profile. The one clamping element 36.2 here clamps a guide strip 50 in place, and the other clamping element 36.2 clamps a sealing band 92 in place. Furthermore, clamping shoe 35.3 is configured and attached in the same manner here, as in the embodiment according to FIG. 10.

FIG. 12 again shows a clamping shoe 35.3 according to FIG. 11. In this embodiment, a positive-lock attachment of guide strip 50 to transport belt 25, using an anchoring element 54, is furthermore provided. In the embodiment shown, this is a rivet 91. For this purpose, both clamping element 36.2 and attachment profile 51.4 of clamping shoe 35.3 each have a passage opening 81, 82, which are disposed vertically above one another in the assembled state shown in FIG. 12. Furthermore, guide strip 50 also has a passage opening 59, whereby rivet 91 is inserted through the aforementioned passage openings 81, 59, 82. Corresponding passage openings 81, 82 both in clamping elements 36.2 to 36.4 and in attachment profiles 51.4 to 51.6 are shown as examples in the additional exemplary embodiments according to FIGS. 13 to 22.

Exemplary embodiments of a clamping shoe 35.2, 35.4 having a single clamping element 36.2, 36.3 are shown in FIGS. 13 and 14 as well as 17 to 19, while embodiments of clamping shoes 35.3, 35.5 having two clamping elements 36.2; 36.3, 36.4 at free ends of the clamping shoes 35.3, 35.5 are shown in FIGS. 15 and 16 as well as 20 to 22.

In this connection, clamping shoes 35.1, 35.3 shown in FIGS. 13 to 16, in the views according to FIGS. 13 and 15, have an essentially rectangular outside contour 85.3 in a projection plane parallel to belt plane 26.1, 26.2. Therefore clamping elements 36.2 and attachment profiles 51.3 as well as 51.4 have an equal width 86 of 20 mm, for example.

Differing from this, clamping shoe 35.4 shown in FIGS. 17 to 19, in the view according to FIG. 17, or mounted to transport belt 25, has a T-shaped outside contour 85.1 in a projection plane parallel to belt plane 26.1, 26.2. The same holds true for clamping shoe 35.5 according to the embodiment shown in FIGS. 20 to 22. Attachment profile 51.5 or 51.6 configured as an attachment strip has parallel outside contours except for transition regions to clamping elements 36.3, 36.4, in each instance, and an average width 86. In comparison, clamping elements 36.3 shown on the left there have a width 87, in partial regions between attachment profile 51.5 or 51.6 and their free clamping ends, which width is preferably very much greater than the average width 86 of the attachment profile 51.5 or 51.6.

At their free clamping ends, clamping elements 36.3 have a width 88 that is preferably very much less than width 87 of clamping elements 36.3 in the aforementioned transition range towards attachment profile 51.5 or 51.6, and here corresponds to width 86 of attachment profiles 51.5, 51.6. This configuration of clamping shoes 35.4 and 35.5 allows particularly advantageous clamping conditions, as well as possibilities for deflection about tight deflection radii, on the one hand, and advantageous force transfer conditions at deflection points, particularly in the region of the deflection rollers 23, on the other hand.

Clamping shoe 35.3 shown in FIGS. 20 to 22 has an additional clamping element 36.4, preferably for the sealing band 92. This clamping element has a width 88, continuously here and towards attachment profile 51.6, which corresponds to width 86 of the attachment profile 51.6.

Accordingly, while only a few embodiments of the present invention have been shown and described, it is obvious that many changes and modifications may be made thereunto without departing from the spirit and scope of the invention.

What is claimed is:

1. A belt band conveyor, comprising:
    an endless transport belt that is guided over deflection rollers;
    a guide element that projects beyond a belt plane and is attached to said transport belt, said guide element being separately formed from the transport belt before being attached to the transport belt, and which runs along with the transport belt as the transport belt circulates, said guide element having guide surfaces which extend in a transport direction of the transport belt;
    rotatable guide rollers having running surfaces that are inclined relative to the belt plane, said running surfaces rolling off on said guide surfaces of said guide element as the transport belt circulates, so that transverse forces that occur crosswise to the transport direction of the transport belt can be compensated; and
    a plurality of separate clamping shoes attached along the transport belt in the transport direction, each clamping shoe having an attachment profile attached to the transport belt, and having a spring-elastic clamping element connected with said profile,
    wherein the guide element comprises an elastic or flexible guide strip that extends substantially without interruption over an entire length of the transport belt in the transport direction, said strip being clamped by the clamping element in place relative to the attachment profile.

2. A belt band conveyor according to claim 1, wherein the guide strip is clamped in place with elastic deformation of the clamping element by the guide strip.

3. A belt band conveyor according to claim 1, wherein the guide strip is clamped in place on the attachment profile with a positive lock.

4. A belt band conveyor according to claim 1, wherein the guide strip is clamped in place by each clamping element, inhibiting or preventing a displacement of the guide strip in the transport direction, and secured relative to the attachment profile so that the guide strip, clamped in place between two adjacent clamping elements, is elastically stretched between the adjacent clamping elements as the transport belt circulates about the deflection rollers.

5. A belt band conveyor according to claim 1, wherein the guide strip is penetrated at least partially by an anchoring element rigidly connected with each clamping element and rigidly connected with the attachment profile, at least in abutment regions, which element results in positive-lock fixation of the guide strip relative to the attachment profile.

6. A belt band conveyor according to claim 1, wherein the clamping element and the attachment profile consist of spring steel.

7. A belt band conveyor according to claim 1, wherein the guide strip is releasably clamped in place.

8. A belt band conveyor according to claim 7, wherein the guide strip is clamped in place so that it can be released again without being destroyed.

9. A belt band conveyor according to claim 7, wherein the guide strip is clamped in place so that it can be released again, except for abutment regions.

10. A belt band conveyor according to claim 1, wherein the clamping element is connected in one piece with the attachment profile.

11. A belt band conveyor according to claim 1, wherein the clamping element is configured as a catch or snap element, on or into which the guide strip is engaged or snapped.

12. A belt band conveyor according to claim 1, wherein the clamping element has an insertion slant at its free end, which slant facilitates insertion of the guide strip.

13. Belt band conveyor according to claim 1, wherein the clamping shoes have a T-shaped or double-T-shaped outside contour in a projection plane parallel to the belt plane.

14. A belt band conveyor according to claim 1, wherein the clamping shoes have an average width in the transport direction that is less than an effective deflection diameter of the deflection roller.

15. A belt band conveyor according to claim 14, wherein the average width of the clamping shoes is equal to or less than the effective deflection radius of the deflection roller.

16. A belt band conveyor according to claim 1, wherein at least one point-shaped attachment point is formed between the attachment profile and the transport belt.

17. A belt band conveyor according to claim 1, wherein a line-shaped attachment point that runs crosswise to the transport direction is formed between the attachment profile and the transport belt.

18. A belt band conveyor according to claim 1, wherein the attachment profile is firmly connected with another clamping element by means of which an elastic or flexible sealing band, which extends in the transport direction over the entire length of the transport belt, is clamped in place relative to the attachment profile, said attachment profile vertically overlapping a cover shank that is fixed in place and extends crosswise to the belt plane in a direction towards the transport belt.

* * * * *